United States Patent Office.

ROBERT C. ANDERSON, OF LONDON, ENGLAND.

GALVANIC BATTERY.

SPECIFICATION forming part of Letters Patent No. 289,795, dated December 11, 1883.

Application filed February 23, 1881. (No specimens.) Patented in England October 20, 1880, No. 4,267.

*To all whom it may concern:*

Be it known that I, ROBERT CHAPMAN ANDERSON, a subject of the Queen of Great Britain, residing at London, England, have invented new and useful Improvements in Galvanic Batteries, (for which I have obtained a patent in Great Britain, No. 4,267, bearing date the 20th October, 1880, and sealed the 25th January, 1881;) and I do hereby declare that the following is a full, clear, and exact description of the invention, which will enable others skilled in the art to which it appertains to make and use the same.

This invention relates to improvements in galvanic batteries, the object of the improvements being to provide a battery which shall be both powerful and constant, without necessitating the employment, as at present, of free mineral acid in the negative solution, whereby I avoid the emission of acid vapors, and also the wasteful action of such acids on the zinc element of the battery, thus promoting constancy and economy of action in the battery, besides making the entire arrangement more cleanly and convenient than hitherto.

In carrying out my improvements for a two-fluid battery, I employ the usual elements—such as carbon and zinc—separated from each other by a porous pot or division in any well-known manner. The zinc may be acted upon by any of the usual solutions, but preferably a solution of chloride of magnesium or of chloride of potassium. For the negative solution I employ chromo-chloride of potassium, to which water in sufficient quantity is added. For a one-fluid battery it will be understood that a porous pot is not required.

One method of preparing this salt is to mix hot or boiling hydrochloric acid with a hot or boiling saturated solution of bichromate of potash in the proportion of about three parts of bichromate of potash to four parts of hydrochloric acid, avoiding, if possible, the evolution of chlorine. The salt is then deposited in crystals on the solution cooling. I however prefer the following process: To about one and a half part of bichromate of potash in crystals I preferably add about the same quantity of water. The solution thus formed is then heated to boiling-point, and while at this temperature two parts of ordinary spirits of salt of commerce or muriatic acid are added, and the solution, being again brought to boiling-point, is evaporated to as great a density as it can conveniently be brought to without chlorine being evolved, and, being then cooled, forms the above-named salt. Should, however, chlorine be evolved during the operation, the process should be immediately stopped, as the resulting salt is not only of less energy when used in batteries, but assumes a form less dense and compact by reason of the long and slender needles into which the salt crystalizes.

I would have it understood that I do not claim any mere mixture of muriatic acid and bichromate of potash in a battery; but my invention consists in a salt manufactured from muriatic acid and bichromate of potash with reference to its use in galvanic batteries; and the advantage due to its use over an ordinary mixture of acid and bichromate of potash is that I have both combined in a solid form, and requiring only the addition of water to form a solution composed of muriatic acid, water, and bichromate of potash.

What I claim as an improvement in galvanic batteries is—

A material for the negative solution of a galvanic battery, consisting of a salt made, as described, from muriatic acid and bichromate of potash combined in a solid form, and needing only the addition of water to form a solution composed of muriatic acid, water, and bichromate of potash.

R. C. ANDERSON.

Witnesses:
A. ALBUTT,
F. PRICE.